Patented Jan. 11, 1927.

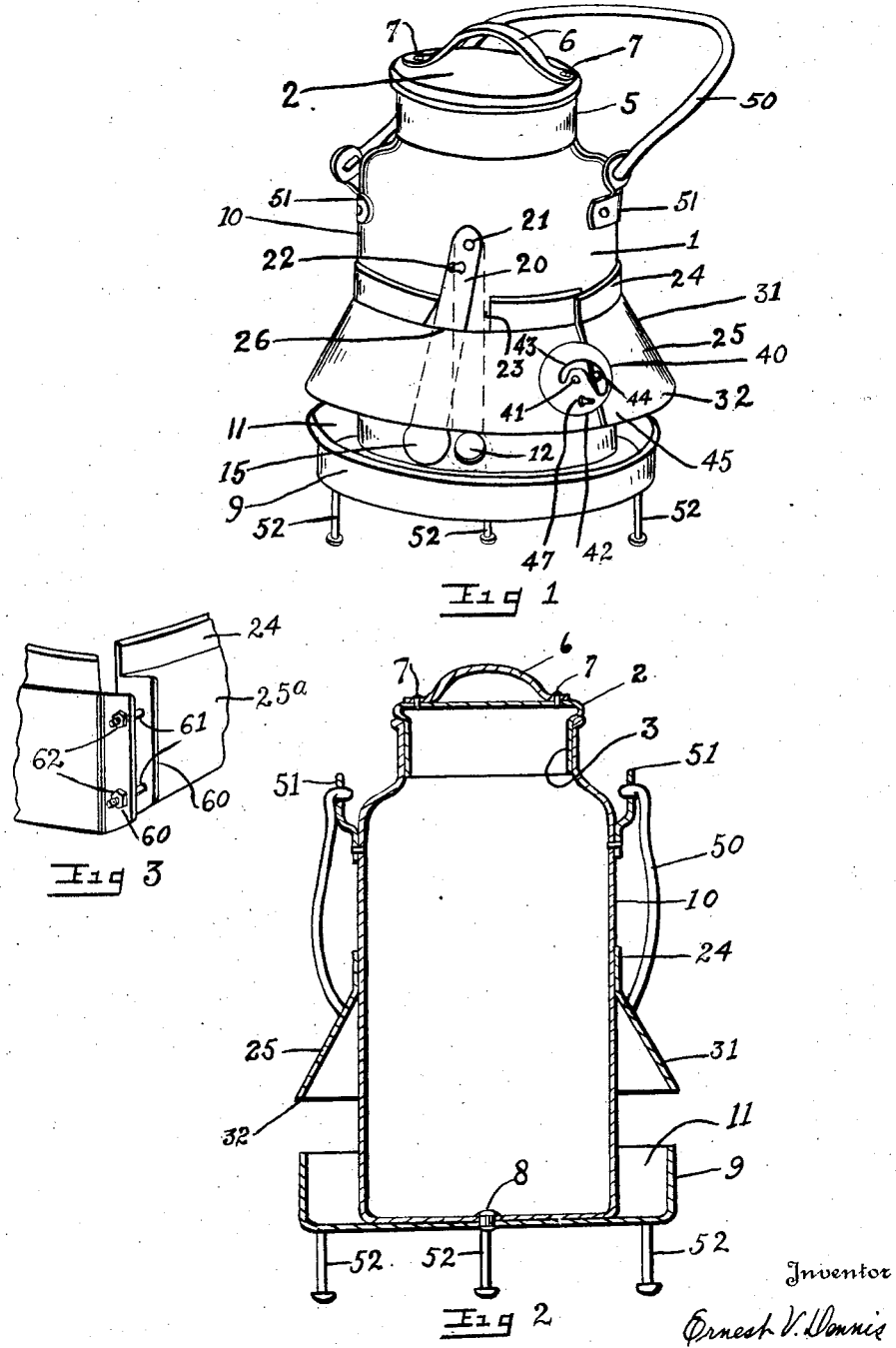

1,613,985

UNITED STATES PATENT OFFICE.

ERNEST V. DENNIS, OF NEW YORK MILLS, NEW YORK.

SANITARY DRINKING FOUNTAIN FOR POULTRY.

Application filed November 10, 1925. Serial No. 68,194.

My invention relates to a sanitary drinking fountain for poultry and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a drinking fountain that will prevent any dirt or other foreign matter getting into the drinking trough, whereby to contaminate the water for drinking purposes. Furthermore, the drinking trough is arranged in such manner that the little as well as the big chickens will not be able to step into the drinking trough.

Moreover, the fountain is equipped with a storage reservoir that can be easily refilled and will automatically feed water to the drinking trough as the same becomes depleted therein.

The object will be understood by referring to the drawings, in which:

Fig. 1 is a perspective view of the sanitary drinking fountain for poultry.

Fig. 2 is a central vertical section of the fountain.

Fig. 3 is a fragmentary detail view showing a modification.

Referring more particularly to the drawings, a storage reservoir for water is represented at 1 and has a cover 2 with a depending flange 3 adapted to make frictional contact with the inside surface of neck 5 of the reservoir 1. A handle 6 is held by rivets 7, 7 to the top part of cover 2.

An annular drinking trough is fastened by a rivet 8 or in any other manner to the bottom surface of reservoir 1. The lateral upstanding wall 9 is concentric with the annular outside wall 10 of reservoir 1, though spaced therefrom in order to provide a drinking trough 11 open at the top from which the chickens will be able to drink.

Water is fed, as needed, from reservoir 1 to drinking trough 11, as it becomes depleted therein through an orifice 12 made in wall 10 of reservoir 1 adjacent the bottom surface thereof. The highest point in orifice 12 is located just below the upper edge of wall 9 in order to shut off the atmosphere pressure within reservoir 1 immediately the level of the water in trough 11 has reached the topmost point of orifice 12 and, thereby, prevent the water from reservoir 1 from overflowing the upper edge of wall 9 of the drinking trough 11.

In order to allow the reservoir 1 to be filled from the top by removing cover 2, orifice 12 is adapted to be covered by a shutter 15. Shutter 15 is round to conform to the shape of orifice 12. It is of much larger diameter, however, and overlaps the contiguous surface of orifice 12 in order to completely cover said orifice 12. Moreover, shutter 15 is formed on a slight curvature to conform to the curvature of the outside surface of wall 10 of reservoir 1. Shutter 15 is formed integral with the rock arm 20 which is pivoted at 21 to the wall 10 of reservoir 1. A laterally extending handle 22 is fastened to arm 20 below fulcrum 21 in order to actuate the same and, thereby, move shutter 15 from open to closed position with reference to orifice 12, as shown by dotted lines in Fig. 1. Furthermore, an opening 23 is made in band 24 of guard or protector 25, in order to allow for the rocking of arm 20. Edge 26 adjacent opening 23 made in guard 25 will make contact with the contiguous surface of arm 20, whereby to hold said arm in any given location of the range of its movement, thereby, permitting shutter 15 to be held in any position ranging from extreme open to closed position.

Guard 25 is made with a band portion 24 adapted to be concentric with the outer surface of wall 10 of reservoir 1 and to be tightened thereabout in order to hold guard 25 in any given vertical position on wall 10 to which it is desired to adjust it. The lower portion 31 of guard 25 is disposed at an angle to band portion 24 in order to extend out over the upper surface of trough 11, whereby to prevent any dirt or foreign matter getting into trough 11, as well as to keep the chickens from stepping therein.

Mechanism is provided for raising or lowering guard 25 to make it adjustable so that the opening between its lower edge 32 and trough 11 will be accommodated to the use of the chickens attempting to drink therefrom. This mechanism embodies a transverse split in guard 25 and band 24, the overlapping of the adjacent ends, and means for drawing said ends together, which means comprises a disk 40 pivoted at 41 to one end 42 of guard 25 and having a cam groove 43 made therein. A pin 44 mounted to the opposite end 45 of guard 25 and projecting laterally therefrom engages groove 43. A handle 47 is fixed to disk 40 and extends therefrom, whereby it may be rotated. If rotated clockwise, ends 42 and 45 will be drawn towards each other, and, thereby, hold guard 25 in any given vertical position along wall 10 of reservoir 1 to govern the size of opening to trough 11.

A bail or handle 50 made of wire is pivoted to the brackets 51, 51 riveted to reservoir 1, whereby to aid in making the device portable. Furthermore, legs 52, 52, 52 are fastened to the underside of trough 11 to elevate it off the base or ground.

The operation of the device is effected by first filling reservoir 1 with water. This may be done by removing cover 2 and closing shutter 15. After reservoir 1 is filled, shutter 15 is moved to open position, whereupon the water will flow out of orifice 12 into trough 11 until the level of the water reaches the highest point of orifice 12 and, thereby, closes the same, whereupon, the atmosphere pressure in reservoir 1 being cut off, the water will cease to flow from reservoir 1 into trough 11. However, as it becomes depleted, it will flow automatically from the reservoir 1.

In Fig. 3 there is shown a modified manner of holding guard 25ª to reservoir 1 of the device. Guard 25ª is split transversely and its free ends turn up at 60, 60 at a right angle. Apertures are made in the ends 60, 60 for the reception of bolts 61, 61. Nuts 62, 62 are mounted to bolts 61, 61 to draw the ends 60, 60 together and thereby hold the guard at any given vertical position on reservoir 1.

Having thus described my invention what I claim as new and desire to secure by Letters Patent is as follows:

In a sanitary drinking fountain for poultry, a reservoir for the storage of water, a removable cover for said reservoir, a drinking trough fastened to said reservoir, an orifice made in said reservoir, whereby to permit the water to pass therefrom to said trough, a shutter for closing said orifice when filling said reservoir, a pivotally mounted arm attached to said shutter, said arm adapted to make frictional contact with the reservoir for holding said shutter in open or closed position, an adjustable guard having a portion extending at an angle for protecting said trough, a disk having a cam groove therein mounted on one end of said guard and a pin mounted on the other end of said guard adapted to engage said cam groove, whereby to hold said guard in given position on said reservoir.

In testimony whereof I affix my signature.

ERNEST V. DENNIS.